United States Patent
Dai (10) Patent No.: US 8,218,539 B2
(45) Date of Patent: Jul. 10, 2012

(54) FLEXIBLE PACKET FIELD PROCESSOR

(75) Inventor: William Dai, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 1260 days.

(21) Appl. No.: 11/583,279

(22) Filed: Oct. 18, 2006

(65) Prior Publication Data

US 2008/0095149 A1 Apr. 24, 2008

(51) Int. Cl.
*H04L 12/56* (2006.01)
(52) U.S. Cl. ......... 370/389; 370/503; 370/392; 370/293
(58) Field of Classification Search .................. 370/389, 370/392, 293, 395.32, 474; 709/224, 225, 709/250

See application file for complete search history.

(56) References Cited

U.S. PATENT DOCUMENTS

| | | | |
|---|---|---|---|
| 6,356,951 B1* | 3/2002 | Gentry, Jr. | 709/250 |
| 6,651,099 B1* | 11/2003 | Dietz et al. | 709/224 |
| 6,963,913 B2* | 11/2005 | Komisky | 709/225 |
| 7,187,694 B1* | 3/2007 | Liao | 370/474 |
| 7,492,763 B1* | 2/2009 | Alexander, Jr. | 370/389 |
| 2002/0186697 A1* | 12/2002 | Thakkar | 370/401 |
| 2004/0125807 A1* | 7/2004 | Liu et al. | 370/395.32 |
| 2009/0313457 A1* | 12/2009 | Katzman et al. | 712/220 |

* cited by examiner

*Primary Examiner* — Robert Wilson
*Assistant Examiner* — Mohamed Kamara
(74) *Attorney, Agent, or Firm* — Brake Hughes Bellermann LLP (57) ABSTRACT

Various embodiments are disclosed relating to the processing of a flexible field packet. A technique may include determining a format of a packet, the packet including one or more variable fields and determining an offset value related to a location of at least one of the variable fields in the packet, wherein the offset value is variable and associated with the format of the packet.

22 Claims, 8 Drawing Sheets

FLEXIBLE PACKET FIELD PROCESSOR

BACKGROUND

Technology is rapidly changing and improving, especially in the field of networking. As such systems designed to transmit information over networks must be able to adapt to changing technologies without having to be replaced.

Information may be transmitted over a network by breaking the information down into smaller data units called packets, and included with the packets, may be header information pertaining to the processing of the packets. Packet processing may refer to the processing of packets as they are received at a switch or other network device. One or more packet processing actions may typically be determined based upon various fields included in the packet. Actions may include, for example, prioritizing the packet, determining a class of service for the packet, editing the packet, forwarding the packet to a selected output port, etc.

As technology and standards change or evolve, various fields and packet formats may change to accommodate new protocols or technologies. Unfortunately, many of the current packet processing techniques tend to be relatively inflexible, and may be unable to easily adapt to new protocols, fields, and packet formats.

SUMMARY

Various embodiments are disclosed relating to the processing of a flexible field packet processor. According to an example embodiment, a method is provided. The method may include determining a format of a packet, the packet including one or more variable fields. The method may also include for example, determining an offset value relating to a location of at least one of the variable fields in the packet, wherein the offset value is variable and associated with the format of the packet.

In another example embodiment, a method is provided. The method may include parsing a packet to determine a format index value based on a format of the packet, wherein the packet includes one or more known fields and one or more variable fields associated with the format of the packet. The method may also include determining, based on the format of the packet, a location of each of the one or more variable fields. The method may also include determining a key based on one or more fields including at least one of the variable fields. The method may also include determining one or more actions to perform on at least part of the packet based on the key.

In another example embodiment, an apparatus is provided. The apparatus may include packet format parsing logic configured to determine a format index value based on a format of a packet. The apparatus may also include variable field locator logic configured to determine a variable offset value for one or more variable or user defined fields associated with the format index value. The apparatus may also include key composer logic configured to determine, based on at least one of the variable fields, a key for one or more slices or field combinations. The apparatus may also include action determination logic configured to determine, based on the key, one or more actions to be performed on the packet for each of the one or more slices or field combinations.

The details of one or more implementations or example embodiments are set forth in the accompanying drawings and the description below. Other features will be apparent from the description and drawings, and from the claims.

DETAILED DESCRIPTION

Figure 1:
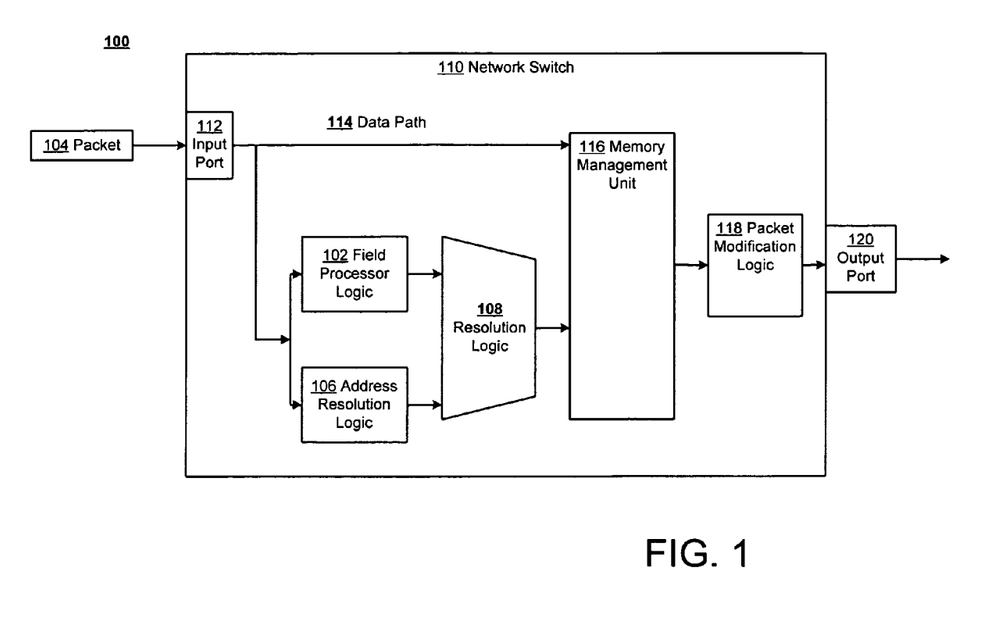
FIG. 1 is a block diagram of an example system 100 for processing a flexible packet according to an example embodiment.

FIG. 1 is a block diagram of an example system 100 for processing a flexible packet according to an example embodiment. In the example of FIG. 1, the system 100 allows a packet to be transmitted with a variable number of user defined fields. This may allow packet processing to be performed on packets having new fields, or packet formats, e.g., to accommodate the protocols, standards or to allow the introduction of new features, for example. For example, by allowing a packet to have a variable number of user defined fields, as new technologies are developed in regards to packet processing and/or transmission, the user defined fields of the packet may be defined to correspond or adapt to the new technologies. Likewise, as existing technologies that have known fields in the packet become obsolete, those known fields may also be replaced with new user defined fields without having to replace all of the equipment involved in the processing and/or transmission of the packet.

The system 100 may be or may include, for example, a network switch 110 (or other network device or packet processing device). In an example embodiment, network switch 110 may be an Ethernet switch, or other type of switch or packet processing device. Network switch 110 may perform a variety of packet processing functions. For example, network switch 110, among other functions that may be performed, may generally receive packets via an input port (such as input port 112), process the packets and/or determine actions to be performed on the packet, and then may forward the packet to an output port, such as output port 120.

Network switch 10 may include a field processor logic 102. Field processor logic 102 may perform processing on a received packet 104, such as packet format parsing, determining one or more packet processing actions to be performed on the packet based on one or more packet fields, etc. For example, field processor logic 102 may operate to determine the format of packet 104 including which fields are present within packet 104 and their locations, generate keys based on the fields, and determine actions to be performed on packet 104 based on the keys.

Packet 104 may be a formatted block of information that may be carried by a computer network or network segment. For example, packet 104 may include a transmission control protocol (TCP) packet, a user datagram protocol (UDP) datagram, or any other block of data or information transmittable from one device to another, across a network.

Packet 104 may include a number of different fields, including a header, a packet body, and possibly a trailer. For example, a header that may contain information for handling the data of the packet. The header may include fields that contain the packet handling information, or which may be used by network switch 110 to determine and perform one or more actions on the packet. For example, the header may include a first field with the source address of the device from which packet 104 has originated, and a second field with the destination address of the device to which packet 104 is destined or directed. A field may be a group of bits that indicate some information about a packet, such as attributes associated with the packet. For example, packet 104 may include an 8 bit field that contains protocol information (e.g. whether packet 104 is a TCP packet or a UDP datagram). Packet 104 may also include, for example, a 32 bit destination MAC address field that contains the value of a network address for the destination computer where packet 104 is to be transmitted, wherein the MAC address field may be read by address resolution logic 106.

Address resolution logic 106 may make a packet forwarding decision, e.g., based on the source and/or destination addresses of a packet. For example, packet 104 may arrive from network device A and may be destined for network device B with this information being stored in known fields of packet 104. Address resolution logic 106 may then for example read the known fields and determine that packet 104 is from network device A and destined for network device B. Then for example, address resolution logic 106 may make a packet forwarding decision (e.g. the best network route to take to reach the destination) and provide this decision and other forwarding information to resolution logic 108.

Resolution logic 108 may determine the queue and/or egress port to which to forward the packet based on a packet forwarding decision. For example, resolution logic 108 may receive a packet forwarding decision from address resolution logic 106 including the destination address of packet 104. Then for example, resolution logic 108 may determine, based on the destination address, which egress port of network switch 110 is associated with the destination address and which queue of the egress port to use based on the priority of packet 104. In another example embodiment, the functionality of resolution logic 108 may be combined with the functionality of field processor logic 102.

Field processor logic 102 may be used to determine the format of a packet including which fields are present within the packet and their locations, generate keys based on the fields, and determine actions to be performed on the packet based on the keys. For example, field processor logic 102 may determine the format of packet 104 and may determine multiple conflicting actions to be performed on packet 104 and field processor logic 102 may provide these actions as well as their priorities to resolution logic 108. The functionality of field processor logic 102 is described in greater detail below in association with an example embodiment illustrated in FIG. 2.

Resolution logic 108 may also make a decision about the processing of a packet. Resolution logic 108 may determine which modifications or actions are to be performed on a packet based on the priorities associated with each action, for example, to the extent such actions may be in conflict. For example, resolution logic 108 may determine that the action with the highest priority is the one that will be performed on packet 104, where there are multiple proposed actions for a packet that may conflict.

Network switch 110 may be a networking device configured to couple or bridge multiple network segments. For example, network switch 10 may be a switch, router, hub, or other networking device configured to receive, process and forward packets. Network switch 110 may have a forwarding capability. For example, network switch 110 may receive packet 104 at input port 112, perform some action or modification on packet 104 and then forward packet 104 on to a destination device via an output port.

While network switch 10 may include any number of ports, only two of the ports (input port 112 and output port 120) are shown in FIG. 1. Input port 112 may be a device configured to receive a packet. For example, input port 112 may be a component of network switch 110, whereby network switch 110 may receive packet 104 from a network segment or network device through input port 112. Input port 112 may then for example pass packet 104, once received, to data path 114.

Data path 114 may be a coupling, channel, link, or other connection configured to carry or transmit data between a first component and a second component. For example, data path 114 may transmit packet 104 from input port 112 to field processing logic 102. Data path 114 may also filter out a bad packet based on an error correction code of the packet. For example, data path 114 may receive packet 104 from input port 112, determine that packet 104 is bad based on the error correction code of packet 104, and drop packet 104. Data path 114 may also for example determine packet 104 is good based on the error correction code of packet 104, and transmit packet 104 from input port 112 to memory management unit 116.

Memory management unit 116 may be a memory unit, buffer, or any other compatible storage device configured to receive and store data. For example, memory management unit 116 may receive packet 104 from data path 114 and store packet 104 until resolution logic 108 transmits a packet descriptor (e.g. processing information about packet 104, including the destination address of packet 104 and the actions to be performed) to memory management unit 116. Memory management unit 116 may then provide this information (e.g., the packet and processing information or action to be performed) to packet modification logic 118.

Packet modification logic 118 may modify and/or configure a packet. For example, packet modification logic 118 may receive an action to be performed on packet 104 from memory management unit 116 (wherein memory management unit 116 may have received this information from the packet descriptor provided by resolution logic 108), wherein the action specifies to break packet 104 into two smaller packets of equal size before transmitting. Packet modification logic 118, may then for example, break packet 104 into two smaller packets of equal size. After modifying a packet in accordance with the action(s), packet modification logic 118 may then forward the packet to the proper egress port. For example, packet modification logic 118 may forward modified packet 104 to output port 120.

Output port 120 may be a device configured to provide a packet to a network, network segment, or network device to which the packet is destined. For example, output port 120 may provide packet 104 (as modified by packet modification logic 118) to a network segment that may include the network device to which packet 104 is destined. Output port 120 may include multiple queues where it receives outgoing packets, wherein each queue may be associated with a different priority of packet. For example, output port 120 may receive packet 104 (as modified by packet modification logic 118) from the queue as specified by memory management unit 116 (as based on the priority of packet 104). In another example embodiment, network switch 110 may include multiple output ports 120.

Figure 2:
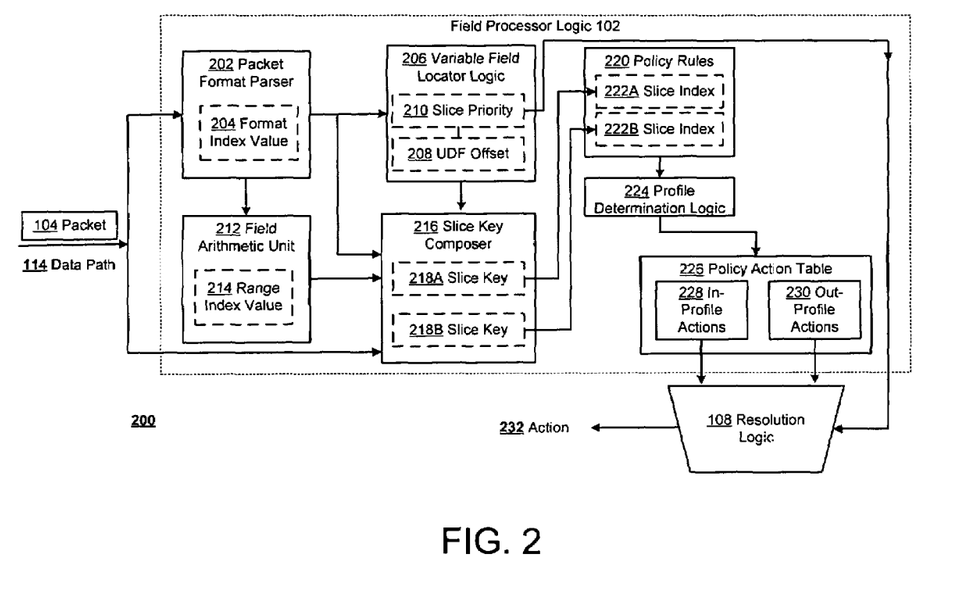
FIG. 2 is a block diagram illustrating an example system 200 for field processor logic 102 of FIG. 1 according to an example embodiment.

FIG. 2 is a block diagram illustrating an example system 200 for field processor logic 102 of FIG. 1 according to an example embodiment. Field processor logic 102 may represent one or more components that may be used to determine the format of a packet including which fields are present within the packet and their locations, generate keys based on the fields, and determine actions to be performed on the packet based on the keys. For example, field processor logic 102 may determine the format of packet 104 as received by data path 114.

Data path 114 may be a link, channel, or other connection configured to carry a packet or bundle of data from one location to another. For example, data path 114 may transmit packet 104 from input port 112 (see FIG. 1) to field processor logic 102.

Packet 104 may be a formatted block of information that may be carried or transported over a computer network, including via one or more network devices. Packet 104 may include a header which may include fields arranged in a particular format, wherein one or more of the fields may be associated with an action to be performed on packet 104, in some cases. Packet 104 may be transmitted by data path 114 to packet format parser 202.

Packet format parser 202 may determine the format of a packet, such as packet 104. In determining the format of a packet, packet format parser 202 may parse the packet (or parse the format of the packet) to determine what attributes the packet does and/or does not include. For example, packet format parser 202 may determine what fields exist within packet 104 and/or what data is included in the fields to determine the format of packet 104. The packet may be determined be one of a plurality of different packet formats. Packet format parser 102 may then store the information pertaining to the format of packet 104 in a format index value 204. The format index value may indicate a format of the packet, which has been determined by packet format parser 202, for example. The parsing of packet 104 by packet format parser 202 is described in greater detail below in association with an example embodiment illustrated in FIG. 4.

Format index value 204 may be a value that represents the format of a packet. For example, format index value 204 may be a string of bits generated by packet format parser 202 that correspond to the format of packet 104. In an example embodiment, two packets with the same format (e.g. same fields and/or field data) may have the same format index value 204. Format index value 204 may be used by a system or system component to determine what fields exist and/or where the fields are located within a packet. For example, variable field locator logic 206 may use format index value 204 to determine where the user defined fields of packet 104 are located.

According to an example embodiment, packet 104 may include a number of fields, including one or more previously known fields, such as an Ethernet MAC source and destination address fields. The location and format of these known fields in the packet may be already known. In addition, according to an example embodiment, packet 104 may include one or more user defined fields (UDFs) or flexible fields, which may allow fields to be added, or the format of a field to be changed, etc. This may allow new packet formats to be developed or implemented to accommodate new protocols, standards or technologies, for example. A network device may have difficulty determining appropriate actions to perform on a received packet having a UDF or variable field. Some techniques are described below where a format of a packet which may have a variable field or UDF is determined, and then one or more actions for such packet may be determined, according to an example embodiment.

Variable field locator logic 206 may determine, based on a format value, where within a packet the user defined fields (UDFs) of the packet may be located for each rule searching slice of the packet, and the priority associated with each slice. Each packet may include multiple slices, wherein each slice may be a combination of fields, such as a known field and a UDF. Then for example, variable field locator logic 206 may determine where the UDFs of packet 104 are located based on format index value 204. Variable field locator logic 206 may then for example search a table (not shown) using format index value 204 as the index with which to search. The search may then for example return a user defined offset 208 (UDF offset 208) including the location of a UDF of packet 104.

User defined field offset 208 (UDF offset 208) may be one or more values used to indicate the location of a user defined field (UDF) within a packet. For example, UDF offset 208 may include two values that indicate the location of a UDF in packet 104. The first value may for example indicate a first offset position within packet 104 and the second value may for example indicate a second offset position relative to the first offset position. In an example embodiment, UDF offset 208 may include more than two values. The locations of the fields, including the UDFs, in packet 104 are discussed in greater detail below in association with FIG. 5.

In addition to determining a UDF location or a UDF offset 208, variable field locator logic 206 may also determine a slice priority 210 which may be associated with UDF offset 208. Slice priority 210 may be a value indicating a priority of a UDF, or may indicate a priority of a combination (or slice) of fields including the UDF. For example, slice priority 210 may indicate the priority of a slice or combination of fields of the received packet 104 that includes the UDF associated with UDF offset 208, for example. In an example embodiment, slice priority 210 may be determined based on a priority policy with which variable field locator logic 206 has been configured. Slice priority 210 may also be used to determine which action should be performed, e.g., as between two or more conflicting actions that have been identified for different slices or combinations of fields, for example.

Packet format parser 202, in addition to providing format index value 204 to variable field locator logic 206, may also provide format index value 204 to field arithmetic unit 212. Field arithmetic unit 212 may perform an arithmetic operation on one or more fields of packet 104, e.g., to assist in further determining a format of a packet or fields, or to determine whether one or more fields satisfies one or more arithmetic conditions. For example, field arithmetic unit 212 may perform a comparison on a field of packet 104. Field arithmetic unit 212 may for example locate a known field of packet 104 based on format index value 204. Then for example, field arithmetic unit 212 may compare the value of the known field to a range of values that may be expected for the known field value. Then if the known field value falls within the expected range of values for example, packet 104 may be determined to be in-range. Otherwise, if the known field value falls outside the range of expected values, packet 104 may be determined to be out-of-range. The in-range/out-of-range determination may then be stored in range index value 214. In other example embodiments, field arithmetic unit 212 may be a component configured to perform any number of different functions with regard to a packet and/or its fields, including, but not limited to, a known field comparison.

Range index value 214 may be a value that represents whether a packet or a field of the packet is in-range or out-of-range. For example, field arithmetic unit 212 may determine, after performing a known field comparison, that packet 104 may have a field with an unexpected value and that the field is out-of-range. Then for example, field arithmetic unit 212 may store this determination in range index value 214. Range index value 214 may be a single bit. For example, an in-range field determination may be indicated with a range index value 214 of '1' while an out-of-range field determination may be indicated with a range index value 214 of '0'.

Range index value 214, format index value 204, UDF offset 208 and packet 104 may then be provided to slice key composer 216. Slice key composer 216 may determine one or more keys associated with a slice or combination of fields of a packet. For example, slice key composer 216 may determine slice key 218A for a first combination of fields of packet 104 and slice key 218B for a second combination of fields of packet 104. Slice keys 218A,B may be values associated with a combination of one or more user defined fields (UDFs) and one or more known fields of a packet. For example, slice key 218A may be a value associated with the UDF of UDF offset 208 and a known field as determined by format index value 204 of packet 104. The determination of slice keys 218A,B by slice key composer 216 is discussed in greater detail below in association with FIG. 3.

Slice key composer 216 may then provide slice keys 218A,B to policy rules 220. Policy rules 220 may be a table of rules stored in a memory unit configured to search for a provided key or value. For example, policy rules 220 may be stored in a content addressable memory (CAM), associative memory, associative storage, associative array, or any other similar memory unit. Then for example, policy rules 220 may search for slice key 218A as provided by slice key composer 216. If policy rules 220 finds slice key 218A, then for example policy rules 220 may return a slice index 222A. Policy rules 220 may perform a similar search with regards to slice key 218B and return slice index 222B.

In an example embodiment a packet may be associated with multiple slices. Then for example, the key for each slice may be distinctive in content and format, which may be decided by variable field locator logic 206. Thus, a single slice of packet 104 may result in slice key 218A which may result in a single slice index 222A. In another example embodiment, multiple slices of packet 104 may result in multiple slice keys 218A,B being generated and multiple slice indexes 222A,B being returned.

Slice indexes 222A,B may be address locations where an action, corresponding to a key or value, may be found in a table, according to an example embodiment. For example, slice index 222A may be a storage address returned by a search of policy rules 220 for slice key 218A. Slice index 222A may then be used to find an action, associated with slice key 218A, in another table. In an example embodiment, a second slice index 222B, associated with a second slice key 218B of packet 104, may be a second storage address corresponding to a second action (e.g., packet processing action) associated with packet 104. Policy rules 220 may then provide slice indexes 222A,B to profile determination logic 224.

Profile determination logic 224 may be a component configured to determine, for example, whether a packet is in-profile or out-profile. A variety of different parameters may be evaluated to determine whether a packet is in-profile or out-profile. For example, profile determination logic 224 may determine an incoming rate or load for a flow associated with a packet and make a profile determination based on the rate or load. For example, if too many packets are received for a flow within a period of time, then the packet 104 of the same flow may be deemed to be out-profile, since the network switch 110 may allocate limited resources for a given flow, for example. One or more actions to be performed on the packet may be impacted depending on whether a packet is determined to be in-profile or out-profile.

In another example embodiment, profile determination logic 224 may receive a first slice index 222A associated with a first packet 104 and a second similar slice index 222A associated with a second packet 104. Then for example, profile determination logic 224 may determine that the time between the receiving of the first slice index 222A and the second slice index 222A is too close and that the flow of packets (e.g. the time between the first packet 104 and the second packet 104) is too fast. Profile determination logic 224 may then determine that the second slice index 222A and/or the first slice index 222A are out-profile. Alternatively, profile determination logic 224 may determine that the time between the receiving of the first slice index 222A and the second similar slice index 222A is proper and that packet 104 is not being transmitted too fast, and that the first slice index 222A and/or the second slice index 222A are in-profile. Profile determination logic 224 may perform a similar analysis with regards to slice index 222B.

Based on the in-profile/out-profile determination, profile determination logic 224 may transmit slice indexes 222A,B to the corresponding in-profile actions 228 or out-profile actions 230 of policy action table 226. In another example embodiment, the profile determination made by profile determination logic 224 may apply to all of the slice indexes 222A,B of packet 104.

Policy action table 226 may be, for example, a table of actions stored in a memory unit configured to search a specified address and return the value stored at that address location. For example, policy action table 226 may be stored in a random access memory (RAM) unit, wherein a search for slice index 222A may return an action associated with slice index 222A. Based on the in-profile/out-profile determination made by profile determination logic 224, the action returned by the policy action table 226 search for slice indexes 222A,B may then be provided to in-profile actions 228 or out-profile actions 230.

In-profile actions 228 may be a policy or algorithm set-up to handle or process in-profile actions. For example, profile determination logic 224 may determine slice index 222A to be in-profile. Then for example, policy action table 226 may retrieve the action of slice index 222A and provide the action to in-profile actions 228. In an example embodiment, in-profile actions 228 may determine that all actions determined to be in-profile shall be performed on packet 104 and that packet 104 should be forwarded to its destination address.

Out-profile actions 230 may be a policy or algorithm set-up to handle or process out-profile actions. For example, profile determination logic 224 may determine slice index 222B to be out-profile (or out-of-profile). Then for example, policy action table 226 may retrieve the action of slice index 222B and provide the action to out-profile actions 230. In an example embodiment, out-profile actions 230 may determine that no action determined to be out-profile shall be performed on packet 104 and that packet 104 should be dropped without being forwarded to its destination address, for example.

Resolution logic 108 may then resolve any conflicts that may arise with regard to the output of in-profile actions 228 and/or out-profile actions 230. Resolution logic 108 may determine which of two conflicting actions should be performed on a packet based on their respective priorities. For example, resolution logic 108 may receive a first action from in-profile actions 228 associated with slice key 218A and a first slice priority 210, wherein the first action is to redirect packet 104 to another network device. Then for example, resolution logic 108 may receive a second action from in-profile actions 228 associated with slice key 218B and a second slice priority 210, wherein the second action is to drop packet 104. Since the first action and the second action conflict, then resolution logic 108 may compare the first slice priority 210 (as provided by variable field locator logic 206) to the second slice priority 210 to determine which action to perform on packet 104. Resolution logic 108 may then output the action 232 with the higher priority. In another example embodiment, resolution logic 108 may receive multiple actions from in-profile actions 228 and/or out-profile actions 230 that do not conflict, and multiple actions 232 may be performed on packet 104.

Action 232 may be an action or modification to be performed on a packet. For example, action 232 may be a modification to be performed on packet 104. In an example embodiment, action 232 may direct that packet 104 be modified, modify a traffic class or priority for packet 104, change an address for packet 104, modify a VLAN (Virtual Local Area Network) ID for packet 104, drop packet 104, redirect packet 104, forward packet 104, and/or perform another modification or other action on packet 104. There may any other number of corresponding and/or conflicting actions 232, the examples above were meant only to be illustrative examples and not intended to be a comprehensive list.

Figure 3:
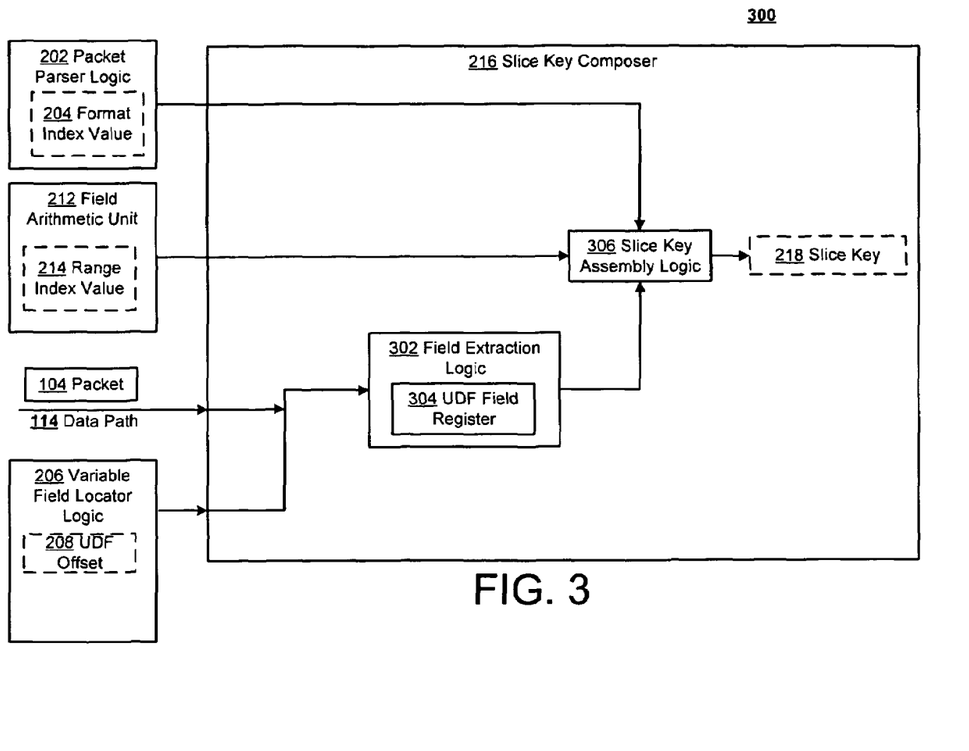
FIG. 3 is a block diagram illustrating an example system 300 for slice key composer 216 of FIG. 2 according to an example embodiment.

FIG. 3 is a block diagram illustrating an example system 300 for slice key composer 216 of FIG. 2 according to an example embodiment. Slice key composer 216 may determine a key or value associated with a combination of fields or information of a packet. For example, slice key composer 216 may determine a key or value based on the known fields and/or user defined fields of packet 104.

Packet 104 may be a formatted block of information that may be carried by data path 114. Data path 114 may be a coupling or link configured to transmit a packet from one device or component to another. For example, data path 114 may transmit packet 104 to slice key composer 216. Packet 104 may include a header containing one or more known fields and one or more user defined fields (UDFs) or variable fields.

Each UDF of packet 104 may have a UDF offset 208 identifying the location of the UDF within packet 104. For example, variable field locator logic 206 may determine UDF offset 208 to be the location of a UDF of packet 104.

Variable field locator logic 206 may determine where in a packet a UDF of the packet is located. For example, variable field locator logic 206 may determine that a UDF of packet 104 is located at position X,Y and store this value in UDF offset 208.

Packet 104 and UDF offset 208 may then be provided to field extraction logic 302. Field extraction logic 302 may extract a field (or may extract data from a field) of a packet based on a provided location or address of the data or field. For example, field extraction logic 302 may extract the data stored in a UDF of packet 104 at the location provided by UDF offset 208. Field extraction logic 302 may then store the extracted data or field from the UDF in UDF field register 304, according to an example embodiment.

UDF field register 304 may be a memory unit used to speed the execution of a task by providing quick access to commonly used values. For example, UDF field register 304 may store the data or field identified by UDF offset 208 in packet 104, as extracted by field extraction logic 302. In another example embodiment, UDF field register 304 may store the header information of packet 104, wherein field extraction logic 302 may access UDF field register 304 to retrieve the data at UDF offset 208. In another example embodiment, UDF field register 304 may store UDF offset 208, wherein UDF field register 304 may then be used to access the data in packet 104 at UDF field offset 208.

Packet format parser 202 may determine a format of a packet. For example, packet format parser 202 may parse a packet or parse a format of a packet to determine the format of packet 104 and generate format index value 204. Format index value 204 may be a value that corresponds to (e.g., identifies) a format of a packet. For example, format index value 204 may correspond to the format of packet 104.

Field arithmetic unit 212 may compare an actual field value of a packet to an expected field value to determine whether the actual field falls within an expected range of values. For example, field arithmetic unit 212 may compare a known field of packet 104 to an expected range of values for the known field to determine whether the known field of packet 104 is in-range or out-of-range and then store this determination in range index value 214. Range index value 214 may be a single bit that is used to store the determination by field arithmetic unit 212 as to whether a field of packet 104 is in-range or out-range.

Format index value 204, range index value 214 and the UDF data extracted by field extraction logic 302 may then be provided to slice key assembly logic 306. Slice key assembly logic 306 may determine a key associated with a slice of a packet. For example, slice key assembly logic 306 may determine a slice or combination of fields for packet 104. A slice may be a combination of one or more fields of a packet, for example. For example, a slice of packet 104 may be a combination of the UDF field or data as determined by field extraction logic 302 and a known field located in packet 104. The known field, may for example, be located based on format index value 204 and range index value 214. Then for example, slice key assembly logic 306 may generate slice key 218 by combining some or all of the information pertaining to the slice and/or packet 104.

Slice key 218 may be a key value associated with a combination of fields or a slice and/or information pertaining to a packet. For example, slice key 218 may be a key associated with a combination of fields including a known field (or UDF) associated with or identified by UDF offset 208 of packet 104. In an example embodiment, slice key 218 may be a value located in a table corresponding to an action and/or an address to an action associated with the slice of slice key 218. In an example embodiment, multiple implementations of slice key composer 216 may result in multiple slice keys 218A,B (see FIG. 1) being generated for a packet 104, in series and/or parallel.

Figure 4:
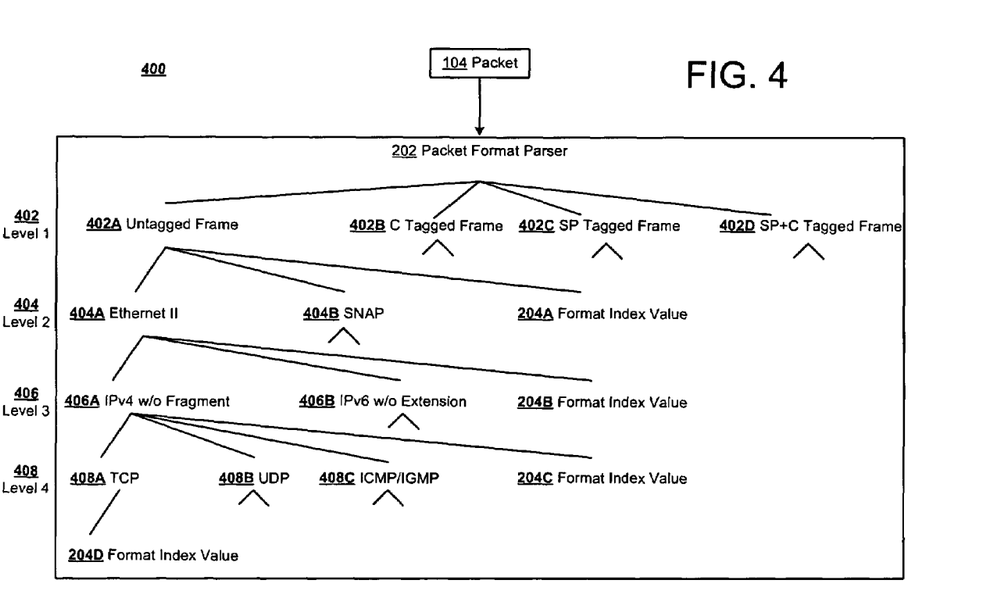
FIG. 4 is a block diagram illustrating an example system 400 for packet format parser 202 of FIG. 2 according to an example embodiment.

FIG. 4 is a block diagram illustrating an example system 400 for packet format parser 202 of FIG. 2 according to an example embodiment. Packet format parser 202 may determine a format of a packet. For example, packet format parser 202 may receive packet 104 and parse the format of the packet 104 to determine its format. Packet 104 may include various attributes or fields that may be associated with the format of the packet and may be stored in known fields of packet 104. Packet format parser 202 may parse the packet 104 to identify one or more of the packet attributes or fields, in order to determine a format of the packet. An example of the format parsing operation of a packet format parser 202 is shown in FIG. 4, where the packet format parser 202 may determine various fields or attributes until finally a format index value for the packet is determined (e.g., indicating a format of the packet). For example, packet 104 may include a level 1 attribute 402. In an example embodiment, the level 1 attribute 402 may be associated with one or more known fields of packet 104.

Level 1 attribute 402 may refer to the general format of a packet. For example, packet 104 may include an untagged frame 402A, a C tagged frame 402B, an SP tagged frame 402C, or an SP+C tagged frame 402D as a level 1 attribute. Based on which frame attribute the packet includes, packet format parser 202 may then determine another attribute included in the packet. For example, packet 104 may include an untagged frame 402A. Then for example, packet 104 may include a level 2 attribute 404. In another example embodiment, packet 104 may include a C tagged frame 402B, an SP tagged frame 402C, or an SP+C tagged frame 402D level 1 attribute 402, in which case packet 104 may include a different set of level 2 attributes.

Level 2 attribute 404 may be an attribute of a packet associated with a lower level attribute of the packet. For example, the level 2 attributes 404, for an untagged frame 402A, may include Ethernet II 404A or SNAP 404B. Then for example, packet 104 may or may not include any of the level 2 attributes 404. If for example, packet 104 does not include a level 2 attribute 404, then packet format parser 202 may determine that packet 104 has a format index value 204A.

Format index values 204 A,B,C,D may be values that represents the format of a packet. For example, packet format parser 202 may determine that because packet 104 includes untagged frame 402A and neither Ethernet II 404A nor SNAP 404B, then packet 104 has format index value 204A.

In another example embodiment, a packet may include a level 2 attribute 404, in which case packet format parser 202 may perform another level of processing. For example, if packet 104 includes Ethernet II 404A, then packet format parser 202 may determine whether packet 104 includes a level 3 attribute 406. In another example embodiment, packet 104 may include SNAP 404B, in which case, packet 104 may include one of a different set of level 3 attributes.

Level 3 attribute 406 may be an attribute of a packet associated with one or more lower level attributes of the packet. For example, level 3 attributes 406 may include attributes of packet 104 with an untagged frame 402A and Ethernet II 404A. As with the level 2 attributes 404, if packet 104 does not contain any level 3 attributes 406 (e.g. IPv4 w/o Fragment 406A and IPv6 w/o Extension 406B), then packet format parser 202 may determine packet 104 has format index value 204B. If however, packet 104 includes a level 3 attribute 406 then packet format parser 202 may continue to determine if packet 104 includes a level 4 attribute 408 (e.g. TCP 408A, UDP 408B, 408C) or whether packet 104 has format index value 204C.

In an example embodiment, packet 104 may have an untagged frame 402A, Ethernet II 404A, IPv4 w/o Fragment 406A, and TCP 408A in which case packet format parser 202 may determine that packet 104 has format index value 204D.

Figure 5:
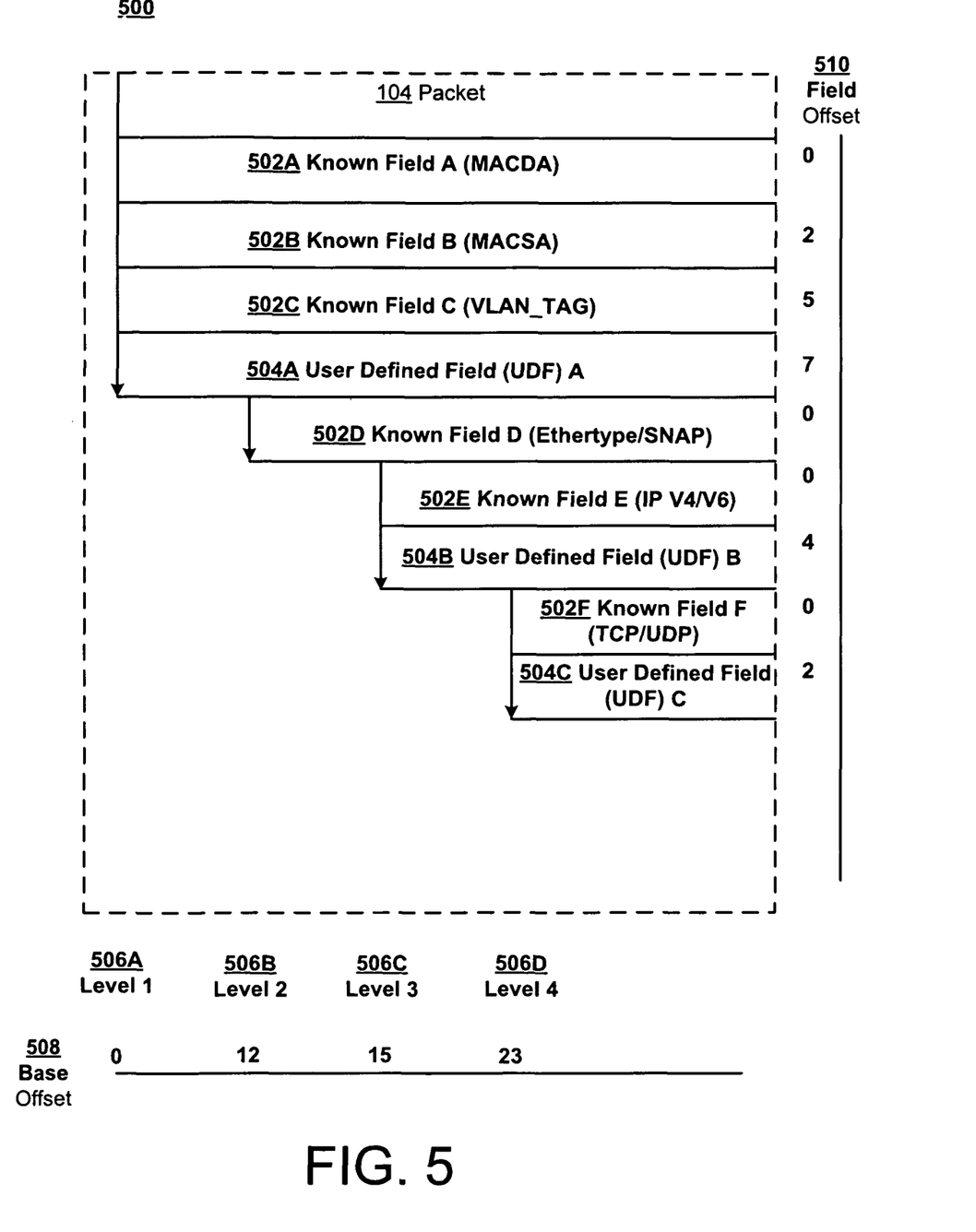
FIG. 5 is a block diagram illustrating an example embodiment 500 for packet 104 of FIG. 1 according to an example embodiment.

FIG. 5 is a block diagram illustrating an example embodiment 500 for packet 104 of FIG. 1 according to an example embodiment. Packet 104 may be a formatted block of information that may be carried by a computer network. Packet 104 may include a number of known fields 502A-F and one or more variable or user defined fields (UDFs) 504A-C.

Known fields 502A-F may each be a field of information in a header of a packet that may be commonly used in transmitting the packet from a first device to a second device. For example, packet 104 may include six known fields 502A,B, C,D,E,F. Then for example each known field 502A-F may include data pertaining to the commonly used information. For example, known field A 502A may include a media access control destination address (MACDA) for the device which the packet is being transmitted to. Known field B 502B and known field C may then contain a media access control source address (MACSA) for the device which the packet is being transmitted from and a virtual local area network tag (VLAN-_TAG), respectively.

In addition to known fields 502A-F, packet 104 may also include user defined fields (UDFs) 504A-C as well. User defined field 504A-C may be a non-industry standard field that may be configurable. User defined fields 504A-C may be configured by a system vendor or an application, or determined in advance, that may allow a packet to be used by a new product or standard, to provide a different feature, etc. For example, UDF 504A may be a field associated with a new network device, wherein the new network device may be the device for which packet 104 is destined. In an example embodiment, packet 104 may include additional, fewer, and/or different UDFs 502A-C in different locations of packet 104.

Packet 104 may also include one or more levels, such as levels 506A, B, C, D. Each of levels 506A-D may include a set of zero or more fields. For example, level 1 506A may include known field 502A, known field B 502B, and known field C 502C and UDF A 504A. Level 2 506B may include known field 502D. Level 3 506C may include, for example, known field 502E and UDF 504B. Level 4 506D may include, for example, know field 502F and UDF 504C.

Although not required, each level 506 A, B, C, D may include a set of fields which may be related to one another or share a common functionality. For example, level 3 506C may include only those fields that may pertain to internet protocol (IP) and/or the network layer (of the OSI network model) and may include known field E 502E and UDF B 504B In an example embodiment, although not required, levels 506A-D of packet 104 of FIG. 5 may correspond to levels 402, 404, 406, 408, respectively of packet format parser 202 of FIG. 4. For example, packet format parser 202 may determine the level 1 402 attribute by looking at the fields located in level 1 506A of packet 104.

In the example embodiment of FIG. 5, each of known fields 502A-F, and/or user defined fields 504A-C of packet 104 may be identified (or have a location determined) by an offset. For example, a location of a UDF may be identified by a UDF offset (see FIG. 2). According to one example embodiment, the offset (e.g., UDF offset 208) may be a single value for each field.

In another example embodiment, the offset for each of one or more known fields 502A-F, and/or user defined fields 504A-C of packet 104 may include an offset pair indicating the location of the field within the packet. According to an example embodiment, the offset pair may include a base offset 508 and field offset 510.

Base offset 508 may identify a location of a level of a packet (e.g., number of bytes of the beginning of the level measured from the beginning of the packet). For example, base offset 508 may indicate the location of each of the levels 506A-D of packet 104. Base offset 508 may, for example, indicate a position or distance of a level from a specified location in the packet, such as the beginning of the packet or other reference location. For example, level 1 506A may have base offset 508 of 0 and thus be located 0 bytes from the beginning of packet 104, as an example. Then for example, levels 2, 3 and 4 506B-D may be have base offsets 508 of 12, 15 and 23, respectively, and be located 12, 15, and 23 bytes from the beginning of packet 104, for example.

Field offset 510 may identify a relative location of a field within a level of a packet. For example, field offset 510 may indicate the location of one of the known fields 502A-F or one of the UDFs 504A-C within a level 506A-D of packet 104. For example, UDF A 504A may be identified by a base offset of 0 (for level 1 506A) and a field offset of 7. Known field D 502D may be identified by a base offset of 12 (for level 2 506B) and a field offset of 0 (e.g., first field within level 2). UDF B 504B may be identified by base offset of 15 (for level 3) and a field offset of 4. UDF 504C may be identified by an offset pair that may include a base offset of 23 (for level 4 506D) and a field offset of 2. In an example embodiment, fields provided higher than level 4 506D may be considered UDFs.

Base offset 508 and field offset 510 may then be provided as an offset pair to identify the location of a field within a packet. For example, user defined field B 504B may be found at base offset 15 and field offset 4. The multiple offset location identification may allow a packet to be modified by adding a UDF field 504A-C to the packet with only minimal disruption to the locations of other fields. For example a new UDF 504X (not shown) may be added to the end of level 2 506B and may have a length of 5 bytes. Then, user defined field B 504B may be found at base offset 20 and field offset 4, while level 4 506D may be located as base offset 28, rather than base offset 23. The field offsets for level 4 would not need to be modified after adding a new field to level 3 (or lower), for example.

In another example embodiment, a level 506A-C may be broken down into sub-levels, and as such the location of a field may be indicated by more than two offsets (e.g. base offset 508 and field offset 510).

Figure 6:
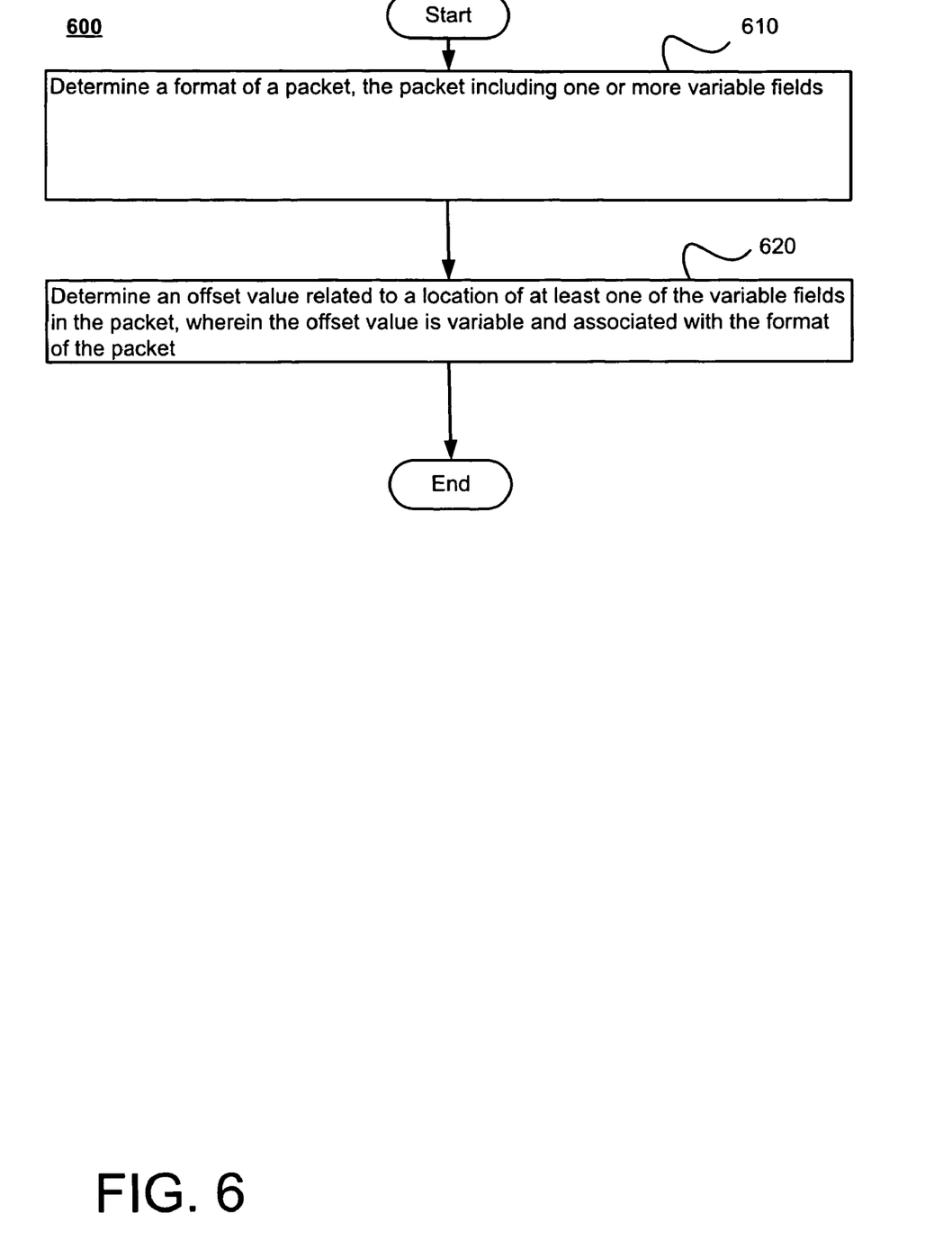
FIG. 6 is a flow chart illustrating processing of a flexible field packet according to an example embodiment.

FIG. 6 is a flow chart illustrating processing of a flexible field packet according to an example embodiment. At 610, a format of a packet may be determined, the packet including one or more variable fields (e.g., or UDFs). For example, packet format parser 202 may determine format index value 204 of packet 104, wherein packet 104 may include user defined fields 504A-C.

At 620, an offset value related to a location of at least one of the variable fields in the packet may be determined, wherein the offset value is variable and associated with the format of the packet. For example, variable field locator logic 206 may determine a UDF offset 208 based on format index value 204. Then for example, UDF offset 208 may include base offset 508 and field offset 510 to define the location of a UDF 504A-C.

Figure 7:
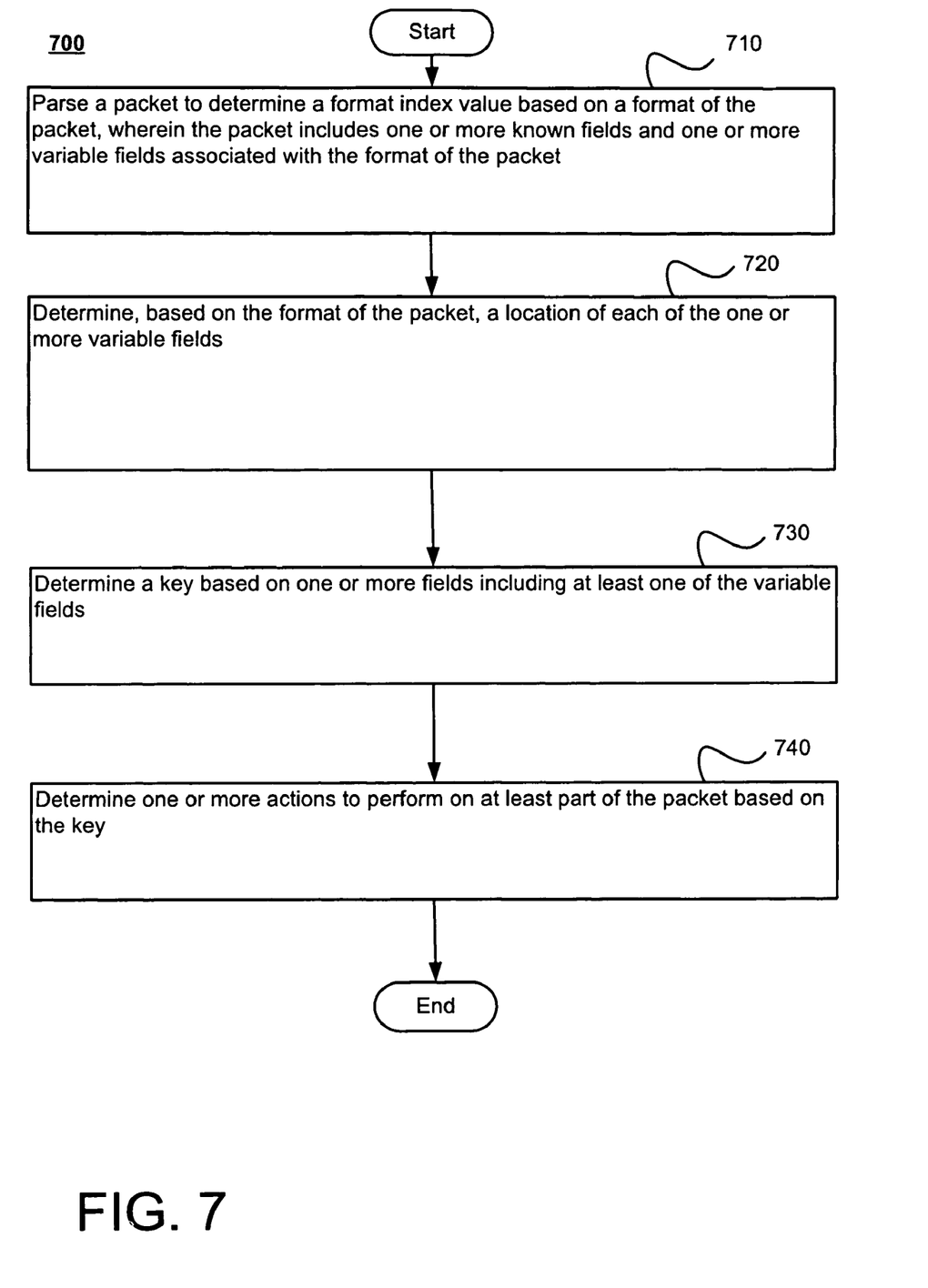
FIG. 7 is a flow chart illustrating processing of a flexible field packet according to an example embodiment.

FIG. 7 is a flow chart illustrating processing of a flexible field packet according to an example embodiment. At 710, a packet may be parsed to determine a format index value based on a format of the packet, wherein the packet includes one or more known fields and one or more variable fields associated with the format of the packet. For example, packet format parser 202 may parse packet 104, wherein a parsing level 402,404,406,408 may correspond to a packet level 506A-D of packet 104. Then for example, level 1 506A may include three known fields 502A-C and one user defined field 504A.

At 720, a location of each of the one or more variable fields may be determined based on the format of the packet. For example, variable field locator logic 206 may determine UDF offset 208, based on format index value 204, for each UDF 504A-C of packet 104.

At 730, a key may be determined, wherein the key may be based on one or more fields including at least one of the variable fields. For example, slice key composer 216 may determine slice key 218 based on the user defined field (UDF) value for UDF offset 208 as determined bye field extraction logic 302.

At 740, one or more actions to perform on at least part of the packet based on the key may be determined. For example, policy rules 220 may determine slice index 222A based on slice key 218A for packet 104. Then for example, policy action table 226 may determine an action to perform on packet 104, based on slice index 222A.

Figure 8:
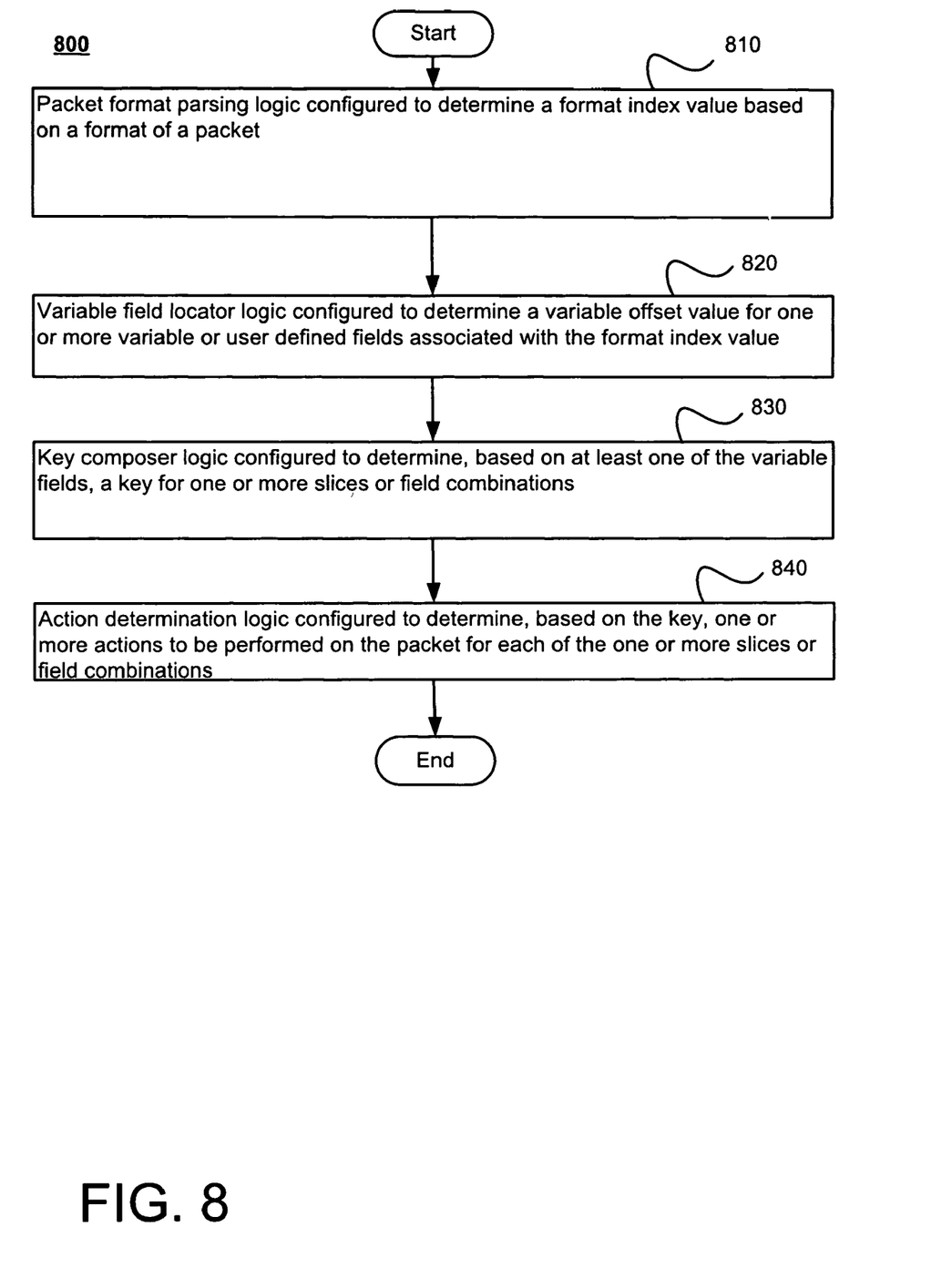
FIG. 8 is a flow chart illustrating processing of a flexible field packet according to an example embodiment.

FIG. 8 is a flow chart illustrating processing of a flexible field packet according to an example embodiment. At 810, a packet format parsing logic may be configured to determine a format index value based on a format of a packet. For example, packet format parser 202 may determine format index value 204 based on the format of packet 104.

At 820, a variable field locator logic may be configured to determine a variable field offset value for one or more variable or user defined fields associated with the format index value. For example, variable field locator logic 206 may determine UDF offset 208 for UDFs 504A-C for packed 104 based on format index value 204.

At 830, a key composer logic may be configured to determine a key for one or more slices or field combinations, wherein the key may be based on at least one of the variable fields. For example, slice key composer 216 may generate slice key 218 based on the user defined field value associated with UDF offset 208 as determined by field extraction logic 302.

At 840, an action determination logic may be configured to determine, based on a key, one or more actions to be performed on a packet for each of one or more slices or field combinations. For example, policy rules 220 may determine a slice index 222A that may be used by policy action table 226 to determine an action, or multiple actions, associated with slice key 218. Then for example, resolution logic 108 may resolve any conflicts between actions to determine what actions may be performed on packet 104.

While certain features of the described implementations have been illustrated as described herein, many modifications, substitutions, changes and equivalents will now occur to those skilled in the art. For example, many of the described implementations refer to single components of a system, when in other implementations multiple such components may exist within the system and those components may work in series and/or in parallel. It is, therefore, to be understood that the appended claims are intended to cover all such modifications and changes as fall within the true spirit of the embodiments of the invention.

What is claimed is:

1. A method comprising:
    determining, by a network switch, an offset pair for each of one or more variable fields on one or more levels of a packet, the packet including a plurality of levels and one or more variable fields on one or more of the levels, each of the offset pairs indicating a location of its respective variable field in the packet, wherein the offset pair includes:
        a variable base offset identifying the level of the respective variable field; and
        a field offset corresponding to a position of the respective variable field on the identified level;
    retrieving a value of each of the variable fields from the packet based on the respective offset pair; and
    performing processing of the packet based on at least one of the retrieved values.

2. The method of claim 1 further comprising determining a format of the packet by:

receiving the packet including one or more well-known fields and one or more variable or user defined fields;

parsing the received packet to determine the format of the received packet; and determining a format index value associated with the format of the received packet.

3. The method of claim 1 wherein the determining the offset pair comprises:

determining that a new field has been added to a first level of the packet, the new field including a length, and wherein a second level is associated with a variable base offset greater than a variable base offset associated with the first level; and increasing the variable base offset of the second level by the length of the new field, wherein the field offset corresponding to the fields of the second level remain unchanged.

4. The method of claim 1 and further comprising:

generating a key based on one or more fields of the packet; and determining one or more actions to be performed on the packet based on the key.

5. The method of claim 1 and further comprising:

generating a key based on one or more fields of the packet;

determining an index to an action table based on the key;

determining one or more actions to be performed on the packet based on the index; and performing the one or more actions on the packet.

6. The method of claim 1 and further comprising:

determining a key for each of a plurality of slices or field combinations;

determining a priority for each of the plurality of the slices;

determining one or more actions to be performed on the packet for each of the slices, wherein a conflict in actions between slices is resolved based on the priority for the slices.

7. The method of claim 1 and further comprising:

generating, for each of a plurality of field combinations, a key based on one or more fields of the packet;

determining, for the one or more field combinations, one or more actions to be performed on the packet based on the key;

determining whether the packet is in-profile or not;

selecting one or more of the determined actions based on whether the packet is in-profile or not; and performing the selected actions on the packet.

8. A method comprising:

parsing a packet to determine a format index value based on a format of the packet, wherein the packet includes one or more known fields and one or more variable fields associated with the format of the packet, wherein the known fields and variable fields are organized into a plurality of levels;

determining, based on the format of the packet, a location of each of the one or more variable fields amongst the plurality of levels;

determining a key based on one or more fields including at least one of the variable fields;

determining one or more actions to perform on at least part of the packet based on the key; and performing the one or more determined actions.

9. The method of claim 8 wherein the determining a location of each of the one or more variable fields comprises:

determining a variable offset value for each of the one or more variable fields, wherein the variable offset value is variable based on the format of the packet.

10. The method of claim 8 wherein the determining a location of each of the one or more variable fields comprises:

determining an offset pair for each of a plurality of variable or user defined fields associated with the format of the packet, each offset pair including:

a variable base offset corresponding to each of the levels; and a field offset, wherein the field offset identifies a location of the variable field relative to the base offset for the variable field.

11. The method of claim 8 and further comprising performing one or more of the actions on the packet.

12. The method of claim 11 wherein the performing one or more of the determined actions comprises performing one or more of:

modifying the packet;

modifying a traffic class or priority for the packet;

changing an address for the packet;

modifying a VLAN ID for the packet;

dropping the packet;

redirecting the packet; or forwarding the packet.

13. The method of claim 8, wherein the determining one or more actions comprises:

searching a content addressable memory based on the key to identify an index; and determining one or more actions to be performed on the packet based on the index.

14. The method of claim 8, wherein the determining one or more actions comprises:

determining a first action to perform on the packet;

determining a second action to perform on the packet, wherein the first action is at least partially incompatible with the second action; and determining to perform the first action based on a comparison of a first priority associated with the first action to a second priority associated with the second action.

15. An apparatus comprising: a packet format parser configured to determine a format index value based on a format of a packet, the packet including a plurality of levels and one or more variable or user defined fields on one or more of the levels;

a variable field locator configured to determine a variable offset value for one or more of the variable or user defined fields associated with the format index value, the variable offset value for each field including a variable base offset corresponding to the level on which the field is located and a field offset;

a key composer configured to determine, based on at least one of the variable fields, a key for one or more slices or field combinations;

an action determiner configured to determine, based on the key, one or more actions to be performed on the packet for each of the one or more slices or field combinations; and a packet modification logic configured to perform the determined one or more actions.

16. The apparatus of claim 15, wherein the variable field locator further comprises:

a field arithmetic determiner configured to determine whether the packet was transmitted from a first device with a transmission speed that is greater than a reception speed of a second device where the packet was received.

17. The apparatus of claim 15, wherein the variable field locator is configured to:

determine the base offset comprising a location of a set of fields of the packet including at least one of the variable or user defined fields; and determine a field offset comprising a location of the one of the variable or user defined fields of the set of fields.

18. The apparatus of claim 15, wherein the action determiner comprises:

an action table comprising the key in association with one or more actions to be performed on the packet;

content addressable memory configured to determine an index including one or more location(s) of the key in the action table; and random access memory configured to determine the one or more actions associated with the key, based on the index.

19. The apparatus of claim 15, wherein the action determiner comprises:

a resolver configured to resolve a conflict between a first action and a second action, wherein the first action is at least partially incompatible with the second action, based on a comparison of a first priority associated with the first action and a second priority associated with the second action.

20. The method of claim 1, further comprising determining a format of the packet.

21. An apparatus comprising:

a network switch configured to:

determine an offset pair for each of one or more variable fields on one or more levels of a packet, one or more of the variable fields providing a new user defined field, the packet including a plurality of levels and one or more variable fields on one or more of the levels, each of the offset pairs indicating a location of its respective variable field in the packet, wherein the offset pair includes:

a variable base offset identifying the level of the respective variable field; and a field offset corresponding to a position of the respective variable field on the identified level; and retrieve a value of each of the variable fields from the packet based on the respective offset pair; and the network switch including a packet modification logic configured to perform processing of the packet based on at least one of the retrieved values.

22. An apparatus comprising:

a network switch configured to:

parse a packet to determine a format index value based on a format of the packet, wherein the packet includes one or more known fields and one or more variable fields associated with the format of the packet, one or more of the variable fields providing a new user defined wherein the known fields and variable fields are organized into a plurality of levels, wherein each level is identified by a respective variable base offset, and a location of each variable field being identified by a respective variable base offset that identifies a level of the variable field and a respective field offset corresponding to a position of the variable field on the identified level;

determine a location of each of the one or more variable fields based on the respective variable base offset and the respective field offset;

determine a key based on one or more fields including at least one of the variable fields;

determine one or more actions to perform on at least part of the packet based on the key; and the network switch including a packet modification logic configured to perform the one or more determined actions.

* * * * *

UNITED STATES PATENT AND TRADEMARK OFFICE
CERTIFICATE OF CORRECTION

| | | |
|---|---|---|
| PATENT NO. | : 8,218,539 B2 | Page 1 of 1 |
| APPLICATION NO. | : 11/583279 | |
| DATED | : July 10, 2012 | |
| INVENTOR(S) | : William Dai | |

It is certified that error appears in the above-identified patent and that said Letters Patent is hereby corrected as shown below:

In column 18, line 16, in claim 22, delete "defined" and insert -- defined field, --, therefor.

Signed and Sealed this
Thirtieth Day of October, 2012

David J. Kappos
*Director of the United States Patent and Trademark Office*